United States Patent [19]

Vassiliou

[11] 4,311,634

[45] Jan. 19, 1982

[54] HEAT STABLE POLYMER COATING COMPOSITION WITH ANTIOXIDANT

[75] Inventor: Eustathios Vassiliou, Newark, Del.

[73] Assignee: E. I. Du Pont de Nemours and Company, Wilmington, Del.

[21] Appl. No.: 136,166

[22] Filed: Mar. 31, 1980

Related U.S. Application Data

[63] Continuation-in-part of Ser. No. 892,297, Mar. 31, 1978, abandoned, which is a continuation-in-part of Ser. No. 606,298, Aug. 22, 1975, abandoned, which is a continuation-in-part of Ser. No. 552,870, Feb. 25, 1975, abandoned, and a continuation-in-part of Ser. No. 509,938, Sep. 27, 1974, abandoned.

[51] Int. Cl.$^3$ .................................................. C08K 3/04
[52] U.S. Cl. ......................... 260/42.27; 260/37 R; 260/37 SB; 260/37 N; 260/45.7 P; 260/45.7 PH
[58] Field of Search ............... 260/37 SB, 37 R, 42.27, 260/37 N, 45.7 P, 45.7 PH

[56] References Cited

U.S. PATENT DOCUMENTS

| | | | |
|---|---|---|---|
| 2,681,324 | 6/1954 | Hochberg | 260/29.6 |
| 2,866,765 | 12/1958 | Smith | 428/422 |
| 2,961,341 | 11/1960 | Long | 428/422 |
| 2,979,418 | 4/1961 | Dipner | 428/422 |
| 2,997,398 | 8/1961 | Kronstein et al. | 260/45.7 P |
| 3,293,203 | 12/1966 | Paulus | 260/37 |
| 3,454,518 | 7/1969 | Kelly | 260/42.27 |
| 3,470,014 | 9/1969 | Koblitz et al. | 428/422 |
| 3,473,949 | 10/1969 | Eldred | 422/302 |
| 3,489,595 | 1/1970 | Brown | 428/422 |
| 3,493,418 | 2/1970 | Amano | 428/407 |
| 3,526,532 | 9/1970 | Heiberger | 428/422 |
| 3,577,257 | 5/1971 | Hutzler et al. | 427/333 |
| 3,692,558 | 9/1972 | Werner | 428/422 |
| 4,120,608 | 10/1978 | Vassiliou | 428/187 |
| 4,122,226 | 10/1978 | Vassiliou | 428/187 |
| 4,150,008 | 4/1979 | Vassiliou et al. | 260/42.27 |
| 4,169,083 | 9/1979 | Vassiliou | 260/42.27 |

*Primary Examiner*—Lewis T. Jacobs
*Attorney, Agent, or Firm*—Richard H. Burgess

[57] ABSTRACT

A coating composition consisting essentially of certain heat-stable polymers, colorants, antioxidant, and liquid carrier useful for coating an article to produce a finish which is capable of maintaining its hue and can have a decorative pattern produced within it. The antioxidant is phosphoric acid which has been neutralized with an excess of ammonia or an organic base, preferably a volatile amine, to give a pH in the coating composition of at least about 8.5.

10 Claims, No Drawings

HEAT STABLE POLYMER COATING COMPOSITION WITH ANTIOXIDANT

CROSS-REFERENCE TO RELATED APPLICATIONS

This application is a continuation-in-part of copending application Ser. No. 892,297, filed Mar. 31, 1978, which in turn is a continuation-in-part of application Ser. No. 606,298, filed Aug. 22, 1975, which in turn is a continuation-in-part of application Ser. No. 509,938, filed Sept. 27, 1974, and a continuation-in-part of application Ser. No. 552,870, filed Feb. 25, 1975, which itself is a continuation-in-part of application Ser. No. 509,938, all above now abandoned.

BACKGROUND OF THE INVENTION

1. Field of Invention

This invention related to a coating composition consisting essentially of heat-stable polymer, colorant, antioxidant and liquid carrier.

2. Prior Art

Articles coated with heat-stable polymer compositions of various types have come into widespread use in recent years. Heat-stable polymer coated articles are useful for purposes requiring or aided by a heat-stable surface. Especially useful are heat-stable polymer coating compositions which provide lubricious surfaces. The uses of coated articles having lubricious surfaces range from bearings to ship bottoms and from iron soleplates to ice cube trays.

To achieve maximum consumer demand for an article, consumer expectations must be met. One consumer expectation is to have a product which is pleasing to his or her aesthetic sense and which is capable of maintaining this pleasing effect throughout the product's useful life.

British Pat. No. 1,495,687, of Apr. 19, 1978, corresponds to an ancestor of the present application and claims other versions of the present invention.

Carbon black is present in known dark colored heat-stable polymer coating compositions. A portion of the carbon black in these coating compositions is oxidized at temperatures attained during the manufacture and use of coated articles. As the carbon black is oxidized, the coatings' hue becomes lighter.

Additionally, the composition of this invention can undergo a process which produces a decorative pattern visible within coatings produced by the composition.

Decorative areas of the coating wear as well as non-decorative areas for the following reasons: The decorative pattern extends through the entire thickness of the coating; therefore, as the coating is worn thinner, the decorative pattern is still present. Concentration of heat-stable polymer is uniform throughout the coating, i.e., the decorative and non-decorative areas; therefore, the coating has uniform heat-stability throughout. Thickness of the coating is uniform, i.e., neither the decorative nor non-decorative areas are higher than the other, thereby not facilitating chipping of a higher area.

SUMMARY OF THE INVENTION

According to the present invention, there is provided a coating composition consisting essentially of certain heat-stable polymers, colorants, antioxidant, and liquid carrier. The composition has a pH of at least about 8.0, preferably 8.9 to 9.5 and consists essentially of (a) a heat-stable polymer stable at temperatures above 300° C. selected from the group consisting of silicone, polysulfide, polymerized parahydroxy benzoic acid, polysulfonate, polysulfonamide, or fluorocarbon polymers, or a mixture thereof;

(b) colorant which is carbon, carbonaceous residue or a mixture thereof;

(c) antioxidant which is phosphoric acid and an organic base or ammonia, said organic base or ammonia being present in a proportion in excess of that needed to completely neutralize the phosphoric acid; and (d) liquid carrier.

This coating composition is capable of undergoing a process which renders a decorative pattern visible within a baked coating produced by the composition. The process consists essentially of applying the composition of this invention either as a subsequent coat over or directly under an oxidation catalyst composition which is arranged in a decorative pattern, wherein the oxidation catalyst or its decomposition or oxidation products diffuse into the coat and catalyze the oxidation of the colorant, thereby rendering, upon baking, the decorative pattern visible within the coating produced by the composition. Also, the coating composition of the invention can be used on its own without the need for any oxidation catalyst.

Since the antioxidant is the reaction product of phosphoric acid and an excess of an organic base or ammonia, the antioxidant is a decomposable salt of phosphoric acid and an excess of an organic base or ammonia. Among the preferred organic bases which produce decomposable salts of phosphoric acid are amines, 2-ethylhexyldiphenyl phosphate, magnesium glycerophosphate, calcium glycerophosphate, iron glycerophosphate, or mixtures of the above.

Preferably the antioxidant is present in quantities which yield at least 0.01 parts by weight, based on total solids and expressed as an acid, of the corresponding free acids of anhydrides when the antioxidant is decomposed and/or oxidized during fabrication and baking.

DESCRIPTION OF THE INVENTION

While any of the compounds described within this application can be utilized within the invention, when cookware is involved, Food and Drug Administration-approved compounds should be used.

A heat-stable polymer is a polymer which is not affected by temperatures above 300° C. which would decompose, oxidize, or otherwise adversely affect most organic compounds. Some examples of heat-stable polymers are silicones, polysulfides, polymerized parahydroxy benzoic acid, polysulfones, polyimides, polyamides, polysulfonates, polysulfonamides, H-resins (sold by Hercules Corporation), and fluorocarbons. One or more heat-stable polymers can be present in the composition of this invention.

The preferred heat-stable polymers are fluorocarbons because of their high temperature stability and release properties. The fluorocarbon polymers used are those of hydrocarbon monomers completely substituted with fluorine atoms or a combination of fluorine and chlorine atoms. Included in this group are perfluoroolefin polymers such as polytetrafluoroethylene (PTFE) and copolymers of tetrafluoroethylene and hexafluoropropylene in all monomer unit weight ratios, fluorochlorocarbon polymers such as polymonochlorotrifluoroethylene, and copolymers of tetrafluoroethylene and perfluoroalkyl vinyl ethers. Mixtures of these can also be used.

The heat-stable polymer is ordinarily present in the composition of a concentration of 25% through 95%, preferably 70% through 90%, by weight of the total solids present in the composition.

Although a dry flour or powder of a heat-stable polymer can be used and a carrier provided separately, a polymer in the form of an aqueous surfactant-stabilized dispersion is preferred for its stability and because it is most easily obtained in that form. Dispersions of heat-stable polymers in organic liquids such as alcohols, ketones, aliphatic, or aromatic hydrocarbons, or mixtures of these, can also be used. In either case, the liquid generally serves as the carrier for the composition.

A colorant is any compound which changes color when oxidized. Carbon and carbonaceous residues are examples of colorants.

For the purpose of this invention, a reaction such as oxidation of carbon black to carbon dioxide, in which a solid is oxidized to a fugitive gas, the solid thereby vanishing from the composition, is considered a color change.

Carbon can be present in concentrations up to 40% or higher based on the weight of total solids of the composition, preferably in concentrations of 0.5–10%.

Carbonaceous residues are produced by decomposition or partial oxidation of organic compounds which includes organo-metallic compounds. Organic compounds are normally present in coating compositions to serve as dispersants, coalescing agents, viscosity builders, etc., or they can be added to serve as colorants.

Although absolute amounts of carbonaceous residues in the heat-stable polymer coating are usually extremely small, nevertheless, they give a definite coloration to a baked coating.

Examples of organic compounds which produce carbonaceous residues are polymers of ethylenically unsaturated monomers, which depolymerize, and whose depolymerization products vaporize, in the temperature range of from 150° C. below the fusion temperature to about the heat-stable polymer's decomposition temperature.

"Depolymerization" means degradation of a polymer to the point at which the degradation products are volatile at the temperatures encountered in curing the coat. The degradation products can be monomers, dimers, or oligomers.

"Vaporize" means volatilization of the degradation products and their evaporation from the film.

Usually the polymers of ethylenically unsaturated monomers contain one or more monoethylenically unsaturated acid units.

Representative of these ethylenically unsaturated monomers are alkyl acrylates and methacrylates having 1 to 8 carbon atoms in the alkyl group, styrene, 2-methyl styrene, vinyl toluene and glycidyl esters of 4 to 14 carbon atoms.

Representative of the monoethylenically unsaturated acids are acrylic acid, methacrylic acid, fumaric acid, itaconic acid, and maleic acid (or anhydride).

The polymer of an ethylenically unsaturated monomer which produces a carbonaceous residue can be present as a coalescing agent in the composition at a concentration of about 3% through 60% by weight of total heat-stable polymer and residue-producing polymer.

Antioxidants of the invention are phosphoric acid, at least completely neutralized with organic base such as triethanolamine or with ammonia, particularly decomposable phosphate salts containing ammonia or amines, 2-ethylhexyldiphenyl phosphate, magnesium glycerophosphate, calcium glycerophosphate, and iron glycerophosphate. The acid is sufficiently neutralized so that the coating composition has a pH of at least 8.0 to prevent coagulation of PTFE suspended in the composition.

The composition of this invention can be pigmented or unpigmented. Any pigment or combination of pigments ordinarily used in this sort of composition can be used.

The composition can also contain such conventional additives as flow control agents, surfactants, plasticizers, coalescing agents, etc., as seem necessary or desirable. These additives are added for reasons, in ways and in amounts known to those skilled in the art.

The amount of total solids in the composition will be governed by the substrate to which the composition is to be applied, method of application, curing procedure and like factors. Ordinarily, the composition will contain 10% through 80% by weight of total solids, but preferably 30–50%.

The composition of this invention is capable of undergoing a process which renders a decorative pattern visible within a baked coating produced from the composition. The decorative pattern has discrete areas which are darker or lighter or a different color than other areas of the pattern. The pattern can have a predetermined geometry, or it can be a random pattern; however, it does not have a uniform, undifferentiated appearance. By a decorative pattern is meant any discrete image, picture, design, configuration, or illustration which can be formed by any conventional method of applying ink.

Processes for producing decorative patterns using compositions of the invention and other ingredients of such compositions and oxidation catalysts are described in U.S. Pat. Nos. 4,054,705 (1977) and 4,120,608 (1978), both to Vassiliou, incorporated herein by reference.

A primer composition, if desired, can be applied either under or over an oxidation catalyst composition used in conjunction with antioxidant coating compositions of the invention. The primer composition can be applied in any of the customary ways, which include spraying, roller coating, dipping, and doctor blading. Spraying is generally the method of choice.

The primer composition can be any conventionally used primer coating. An example is the silica-perfluorocarbon primer disclosed by E. J. Welch in U.S. patent application Ser. No. 405,798, filed Oct. 12, 1973, now abandoned.

The coating composition of this invention is applied to a thickness of about 0.5–5 mils (dry) and baked for a time and at a temperature sufficient to fuse or cure the heat-stable polymer being used.

Preferred oxidation catalyst compounds are:
Cobalt octoate
Bismuth octoate
Cerium octoate
Manganese octoate
Iron octoate Most preferred as an oxidation catalyst for general purposes of the invention is a combination of cobalt and cerium octoates.

The process and composition of this invention are useful for any article that may use a heat-stable polymer surface; examples are cookware, especially fry pans, bearings, valves, wire, metal foil, boilers, pipes, ship bottoms, oven liners, iron soleplates, waffle irons, ice cube trays, snow shovels, saws, files and drills, hoppers and other industrial containers and molds.

The following examples are representative of the invention. All parts and percentages are on a weight basis unless otherwise stated. Coating compositions of the examples have a pH about in the range of 8.5 to 9.0.

EXAMPLE 1

Prepare coating compositions as follows:

(a) Add slowly 110.66 parts by weight of deionized water to 657 parts by weight of an aqueous dispersion of polytetrafluoroethylene containing 6% by weight isooctylphenoxypolyethoxyethanol.

(b) Add slowly, with stirring, to the product of (a) 115.75 parts by weight of an aqueous dispersion, 40% solids of a methyl methacrylate/ethyl acrylate/methacrylic acid terpolymer having monomer weight ratios of 39/57/4.

(c) Prepare a black mill base by mixing and then pebble milling:

|  | PARTS BY WEIGHT |
| --- | --- |
| Carbon | 20 |
| Aluminosilicate pigment | 10 |
| Sodium polynaphthalene sulfonate | 3 |
| Water (deionized) | 67 |

(d) Prepare a titanium dioxide dispersion by mixing and then pebble milling:

|  | PARTS BY WEIGHT |
| --- | --- |
| Titanium dioxide | 45 |
| Water (deionized) | 54.5 |
| Sodium polynaphthalene sulfonate | .5 |

(e) Prepare a cobalt oxide dispersion by mixing and then pebble milling:

|  | PARTS BY WEIGHT |
| --- | --- |
| Cobalt oxide | 45 |
| Water (deionized) | 55 |

(f) Add slowly, with stirring and in order, to the product of step (b):

|  | PARTS BY WEIGHT |
| --- | --- |
| Black mill base | 10.72 |
| Titanium dioxide dispersion | 81.21 |
| Cobalt oxide dispersion | 9.74 |

|  | PARTS BY WEIGHT |
| --- | --- |
| Triethanolamine | 25.88 |

|  | PARTS BY WEIGHT |
| --- | --- |
| Toluene | 46.36 |
| Butyl carbitol | 15.63 |
| Oleic acid | 12.13 |

(h) Add slowly, with stirring, 109.83 parts by weight of the solvent-surfactant of (g) to the product of (f).

(i) Prepare a composition consisting of 1 part by weight of phosphoric acid (85%) per 5 parts by weight of triethanolamine. This is sufficient triethanolamine to neutralize completely the phosphoric acid. The thus neutralized phosphoric acid is sometimes referred to herein as the "phosphoric acid composition."

(j) Add a sufficient amount of the phosphoric acid composition of (i) to a portion of the product of (h) to produce a coating composition containing 1% phosphoric acid composition.

(k) Add a sufficient amount of the phosphoric acid composition of (i) to a portion of the product of (h) to produce a coating composition containing 2% phosphoric acid composition.

Prepare twelve aluminum panels by frit-coating and priming according to the directions of Example 3 of U.S. application Ser. No. 405,798, filed Oct. 12, 1973.

Spray the coating composition not containing phosphoric acid, i.e., the product of (g), to a thickness of 1 mil (dry) on four of the panels and dry in air.

Spray the coating composition containing 1% phosphoric acid composition, i.e., the product of (j), to a thickness of 1 mil (dry) on four other panels and dry in air.

Spray the coating composition containing 2% phosphoric acid composition, i.e., the product of (k), to a thickness of 1 mil (dry) on the four remaining panels and dry in air.

Place all twelve panels into an oven at 430° C. When the temperature of the panels reaches 430° C., remove one of each differently coated panel. After intervals of 5 minutes, 15 minutes, and 30 minutes of baking at 430° C., remove another of each differently coated panel.

Measure the amount of reflected light of each panel using a reflectometer. The reflectometer readings are as follows:

| Panels Coated With Composition Containing | 0 Min. | 5 Min. | 15 Min. | 30 Min. |
| --- | --- | --- | --- | --- |
| No phosphoric acid | 20 | 28 | 48 | 47 |
| 1% of phosphoric acid composition | 20 | 20 | 22 | 27 |
| 2% of phosphoric acid composition | 20 | 20 | 21 | 21 |

Higher numbers indicate more reflected light which signifies lighter color or less carbon present in the coating.

This example shows that coatings produced by compositions containing phosphoric acid are significantly more color-fast than coatings produced by compositions not containing phosphoric acid.

EXAMPLE 2

Prepare coating compositions as follows:

(a) Add 9.46 parts by weight of deionized water to 67.53 parts by weight of an aqueous dispersion of polytetrafluoroethylene, 60% solids containing 6% by weight of isooctylphenoxypolyethoxyethanol.

(b) Add slowly, with stirring, to the product of (a) 11.98 parts by weight of an aqueous dispersion, 40% solids of a methyl methacrylate/ethyl acrylate/methacrylic acid terpolymer having monomer weight ratios of 39/57/4.

(c) Prepare a black mill base by mixing and pebble milling:

|  | PARTS BY WEIGHT |
|---|---|
| Triethanolamine | 7.00 |
| Oleic acid | 3.28 |
| Butyl carbitol | 4.23 |
| Toluene | 12.56 |
| Deionized water | 59.39 |
| Channel black | 15.69 |
| Aluminosilicate pigment | 7.84 |

(d) Prepare a red mill base by mixing and ball milling overnight:

|  | PARTS BY WEIGHT |
|---|---|
| Deionized water | 33.75 |
| Oleic acid | 3.33 |
| Triethanolamine | 6.67 |
| Toluene | 8.84 |
| Butyl carbitol | 2.84 |
| Red iron oxide | 45.00 |

(e) Add, slowly and with stirring, 4.33 parts by weight of the black mill base and 3.58 parts by weight of the red mill base to the product of (b).

(f) Add slowly, with stirring, 3.12 parts by weight of a solvent-surfactant mixture, prepared as in (g) of Example 1, to the product of (e).

(g) Add sufficient amounts of a phosphoric acid composition, prepared as in (i) of Example 1, to a portion of the product of (f) to produce a coating composition containing 4% by weight of the phosphoric acid composition.

Prepare six aluminum panels by frit-coating and priming as in Example 1.

Spray the composition not containing any phosphoric acid composition, i.e., the product of (f), to a thickness of 1 mil (dry) on three of the panels and dry in air.

Spray the composition containing 4% of the phosphoric acid composition, i.e., the product of (g), to a thickness of 1 mil (dry) on the remaining three panels and dry in air.

Place all six panels into an oven at 430° C. When the temperature of the panels reaches 430° C., remove one of each differently coated panel. After 5 minutes at 430° C., remove the second of each differently coated panel and after 15 minutes remove the last of each differently coated panel.

Measure the amount of reflected light of each panel using a reflectometer. The reflectometer readings are as follows:

| Panels Coated With Composition Containing | 0 Min. | 5 Min. | 15 Min. |
|---|---|---|---|
| No phosphoric acid | 33 | 38 | 54 |
| 4% of phosphoric acid composition | 32 | 31 | 31 |

Higher numbers indicate more reflected light which signifies lighter color or less carbon present in the coating.

This example shows that coatings produced by a composition containing phosphoric acid are significantly more colorfast than coatings produced by compositions not containing phosphoric acid.

EXAMPLE 3

Frit-coat and prime an aluminum panel as in Example 1.

Prepares an oxidation catalyst composition consisting of:
60% by weight cobalt octoate in mineral spirits (12% metal content by weight)
40% by weight oleic acid.

Stamp the oxidation catalyst composition in a decorative pattern upon the aluminum panel.

Spray the coating composition of Example 1 which contains 2% of the phosphoric acid composition onto the panel to a thickness of 0.7-mil (dry). Dry the panels in air.

Bake the air-dried panel at 430° C. for 5 minutes.

The area of the coating over the oxidation catalyst composition becomes considerably lighter while the other areas of the coating maintain their hue thereby producing a light decorative pattern upon a gray background.

EXAMPLE 4

Frit-coat and prime three aluminum panels as in Example 1.

Prepare three oxidation catalyst compositions as follows:
1. Cerium octoate in 2-ethyl hexanoic acid (12% metal content by weight);
2. Manganese octoate in mineral spirits (6.0% metal content by weight);
3. Bismuth octoate in 2-ethyl hexanoic acid (8.5% metal content by weight).

Stamp one of the oxidation catalyst compositions in a decorative pattern upon each of the three aluminum panels.

Spray the coating composition of Example 3 onto each panel to a thickness of 0.7-mil (dry).

Dry the panels in air.

Bake the air-dried panel at 430° C. for 5 minutes.

The areas of the coatings over the oxidation catalyst compositions become considerably lighter while the other areas of the coatings maintain their hue thereby producing a light decorative pattern upon a gray background.

COMPARATIVE TEST

In order to show superiority over the suggestions of U.S. Pat. No. 3,489,595—Brown (1970), certain tests were performed.

Brown discloses the use of $NH_4H_2PO_4$ and $(NH_4)_2$—$HPO_4$, or other phosphate salts, along with $Al_2O_3$ or $B_2O_3$, provide a perfluorocarbon coating composition with enhanced adhesion to a substrate. Brown is not concerned with antioxidant effects or maintaining a dark color, such as to use in making a design. Whether his compositions would possess such characteristics or not, the following tests indicate that the shelf stability of composition of the present invention would be superior to that of Brown's composition.

Coating compositions were prepared containing, by weight, 28% PTFE solids, 0.1 channel black water, and phosphoric acid neutralized with ammonia or triethanolamine to four different degrees, as indicated in the table below. The table shows the approximate pH of each composition. The table also shows the time, in minutes, for each composition to coagulate in a Waring Blender run under constant conditions. This shows the shear stability of the composition, which is an indication of the likely relative shelf life of the composition before coagulation.

| Phosphate Form | Approximate pH | Coagulation Time (Minutes) |
|---|---|---|
| (TEA)$_3$ PO$_4$ with excess triethanolamine | 9 | >20 |
| (NH$_4$)$_2$HPO$_4$ | 7 (basic) | 9 |
| (NH$_4$)$_3$H$_3$PO$_4$ | 7 (neutral) | 9 |
| NH$_4$H$_2$PO$_4$ | 6 | 10 |

This indicates that excess triethanolamine gives a composition with superior shelf stability. Even so, the base in such compositions is volatile at temperatures used to cure coatings. Volatilization of the base leaves the phosphoric acid able to perform its function as an antioxidant as the coating cures and later to minimize loss of color in use.

Other tests with triethanolamine in excess over the amount of phosphoric acid, but with other acidic material present which bring the pH down to about 7, even thought slightly basic, did not show this differentation. Thus, the pH of the composition is important.

What is claimed is:

1. A coating composition having a pH of at least about 8.0 and consisting essentially of
    (a) a heat-stable polymer stable at temperatures above 300° C. which is selected from the group consisting of silicone, polysulfide, polymerized parahydroxy benzoic acid, polysulfonate, polysulfonamide, or fluorocarbon polymers, or a mixture thereof;
    (b) colorant which is carbon, carbonaceous residue, or a mixture thereof;
    (c) antioxidant which is a decomposable salt of phosphoric acid and an organic base or ammonia, said organic base or ammonia being present in a proportion in excess of that needed to completely neutralize the phosphoric acid, said salt optionally including amine, 2-ethylhexyldiphenyl phosphate, magnesium glycerophosphate, calcium glycerophosphate, iron glycerophosphate, or mixtures of the above; and
    (d) liquid carrier.

2. The composition of claim 1 wherein the phosphoric acid of (c) is neutralized with triethanolamine and the pH is about in the range of 8.5 to 9.0.

3. The composition of claim 1 wherein the heat-stable polymer is fluorocarbon.

4. The composition of claim 3 wherein the fluorocarbon is a polymer of a hydrocarbon monomer completely substituted with fluorine atoms or a combination of fluorine atoms and chlorine atoms.

5. The composition of claim 3 wherein the fluorocarbon is a perfluoroolefin.

6. The composition of claim 5 wherein the perfloroolefin is polytetrafluoroethylene, a copolymer of tetrafluoroethylene and hexafluoropropylene, or mixtures of the above.

7. The composition of claim 1 wherein the carbonaceous residue of (b) is produced by a polymer of an ethylenically unsaturated monomer.

8. The composition of claim 1 further consisting of pigment, flow control agent, surfactant, plasticizer, coalescing agent, or mixtures of the above.

9. The composition of claim 1 wherein the composition consists essentially of
    (a) 25–95%, based on the weight of total solids, of heat-stable polymer,
    (b) 0.5–60%, based on the weight of total solid, of colorant,
    (c) enough of the antioxidant to yield at least 0.01 parts by weight, based on total solids and expressed as an acid, of the corresponding free acids of anhydrides when the antioxidant is decomposed and/or oxidized during fabrication and baking, and
    (d) liquid carrier.

10. The composition of claim 9 wherein
    (a) the heat-stable polymer is perfluoroolefin;
    (b) the colorant is carbon, carbonaceous residue, or mixtures of carbon and carbonaceous residue; and
    (c) the antioxidant is decomposable salt of phosphoric acid containing ammonia or amines, 2-ethylhexyldiphenyl phosphate, magnesium glycerophosphate, calcium glycerophosphate, iron glycerophosphate, or mixtures of the above.

* * * * *